United States Patent
Lu et al.

(10) Patent No.: US 8,588,813 B2
(45) Date of Patent: Nov. 19, 2013

(54) APPARATUS, AND ASSOCIATED METHOD, FOR ESTIMATING THE LOCATION OF A GAN-CAPABLE MOBILE STATION

(75) Inventors: Jian J Lu, Plano, TX (US); Mike Aguilar, Richardson, TX (US); Bruno Landais, Pleumeur-Bodou (FR)

(73) Assignee: Alcatel Lucent, Paris (FR)

( * ) Notice: Subject to any disclaimer, the term of this patent is extended or adjusted under 35 U.S.C. 154(b) by 1366 days.

(21) Appl. No.: 11/538,076

(22) Filed: Oct. 3, 2006

(65) Prior Publication Data
US 2008/0081620 A1  Apr. 3, 2008

(51) Int. Cl.
*H04W 24/00* (2009.01)

(52) U.S. Cl.
USPC ..................................... 455/456.2; 455/456.1

(58) Field of Classification Search
USPC ........ 455/456.2, 435.1, 456.1, 403, 517, 445, 455/521, 431, 430, 432.1, 427, 428, 456.6; 340/945, 963, 970, 973; 342/457
See application file for complete search history.

(56) References Cited

U.S. PATENT DOCUMENTS

| 6,466,796 | B1 * | 10/2002 | Jacobson et al. ........... 455/456.3 |
| 2005/0181805 | A1 * | 8/2005 | Gallagher ................. 455/456.1 |

* cited by examiner

*Primary Examiner* — Charles Appiah
*Assistant Examiner* — Alexander Yi
(74) *Attorney, Agent, or Firm* — Garlick & Markison (57) ABSTRACT

Apparatus, and an associated method, for providing a location estimate of a GAN (Generic Access Network) mobile station. Data is collected pertaining to the location of the network at which the mobile station is connected in communication connectivity. The data is stored at a database that is subsequently accessible. And, pursuant to a call to a PSAP or pursuant to another location service provided by a location service center, appropriate data is retrieved and used pursuant to the location estimate.

18 Claims, 6 Drawing Sheets

APPARATUS, AND ASSOCIATED METHOD, FOR ESTIMATING THE LOCATION OF A GAN-CAPABLE MOBILE STATION

The present invention relates generally to a manner by which to estimate the location at which the mobile station, such as a GAN-capable mobile station operable in a GAN (Generic Access Network) radio communication system, is positioned. More particularly, the present invention relates to apparatus, and an associated method, by which to determine positioning information that identifies the location of the mobile station that utilizes the GAN through which to communicate. Position information pertaining to the location of network structure through which the mobile station communicates is collected. The information is used to provide the location estimate. The location estimate is retrieved and provided, e.g., to a public service access point or mobile location center pursuant to a request made by the mobile station for assistance.

BACKGROUND OF THE INVENTION

Advancement in communication technologies has provided the basis for the development and deployment of new types of radio communication systems. The use of radio communication systems through which to communicate telephonically has become widespread, even pervasive. And, for many, telephonic communications by way of radio communication systems have become a primary means of telephonic communication, replacing the use of wireline, in part, communication systems through which to communicate.

A cellular communication system is exemplary of a radio communication system that has been widely deployed and whose use is widespread. New-generation, cellular communication systems also provide for high-speed, data communication services. A cellular communication system shall, at times, be referred to herein as a wide area network (WAN) due to its typical implementation to encompass large geographical areas.

Other radio communication systems have analogously been developed and deployed to provide for telephonic communication services. Wireless local area networks (WLANs) also known as WiFi (Wireless Fidelity) networks, and other short-distance wireless networks, for example, are also used by many to communicate telephonically. Wireless local area networks sometimes provide for cost advantages over their wide area network counterparts, and, for this reason, are sometimes preferred over a cellular, or other wide area network counterpart, when both networks are available through which to communicate.

Significant efforts have been made to provide for inter-working between the different types of radio communication systems and their communication connectivity with wireline networks. And, multi-mode mobile stations are available, permitting a user to communicate through the use of a selected communication network of more than one type of communication network. For instance, multi-mode mobile stations operable to communicate both by way of a cellular communication system and by way of a wireless local area network are available. Automatic or manual selection of the network through which to communicate is made based on, e.g., the availability of the network and a preference scheme in the event that more than one network is available through which to communicate.

The network through which a mobile station communicates is, sometimes, transparent to a user as the communication experience, from the perspective of the user, is the same, irrespective of the communication network through which the telephonic communications are effectuated. However, the structure of the different communication networks is sometimes significantly different, formed of different network elements and operable pursuant to different operating protocols. For instance, in a generic access network (GAN), sometimes also referred to as a universal unlicensed mobile access (UMA) network, access points (APs) are entities at which a mobile station establishes an IP connection with a generic access network controller (GANC) or UMA network controller. However, cellular networks, such as a GSM (Global System for Mobile communications) cellular communication system, do not utilize access points. Other structures and entities, instead, are utilized.

Various features developed for, and available for use in, cellular communication systems are not available for use in a generic access network system. Automatic location positioning of a mobile station, for instance, mandated for cellular communication systems is generally unavailable in a generic access network. Automatic location positioning is important, for instance, when a user of a mobile station places a call to a public safety access point (PSAP) and requests emergency assistance. If the caller is unable to identify the location at which the caller is positioned when making the request, personnel of the PSAP might be unable adequately to respond to the request. Because the cellular-system automatic location positioning procedures are not available in a GAN system, if the caller places the call for assistance by way of a GAN system from a location at which cellular coverage is unavailable, personnel of the PSAP are unable to identify the location from which the call is made in the event that the caller is unable verbally to provide such information. Automatic location positioning is also used pursuant to other location communication services.

A mechanism by which to provide automatic location positioning of a mobile station operable in a GAN system is therefore needed.

It is in light of this background information related to location positioning mechanisms for mobile stations that the significant improvements of the present invention have evolved.

SUMMARY OF THE INVENTION

The present invention, accordingly, advantageously provides apparatus, and an associated method, by which to estimate the location at which a mobile station, such as a GAN-capable mobile station operable in a GAN (Generic Access Network) radio communication system, is positioned.

Through operation of an embodiment of the present invention, a manner is provided by which to determine positioning information that identifies the location of the mobile station that utilizes the GAN through which to communicate.

In one aspect of the present invention, position information pertaining to the location of network structure through which the mobile station communicates is collected. The collected information is retrieved, and is provided, e.g., to a public service access point pursuant to a request for assistance made by the mobile station. Thereby, a response to the request can be made even if the requester using the mobile station is unable to provide to the public service access point the location information from which the request is made. The collected information is alternately provided to a mobile location center used pursuant to any generic location communication service.

In another aspect of the present invention, information is collected pertaining to a network portion through which the mobile station communicates, thereby to identify an area at which the mobile station is positioned. The area defines the estimate of the location positioning of the mobile station. The identity of the network portion and its location, e.g., in terms of a latitudinal and longitudinal coordinate set is ascertained and is stored, available for subsequent retrieval. The network portion forms, for instance, a GAN network access point (AP). When the mobile station forms a multi-mode device, operable also in a cellular communication system, the network portion also comprises a base station, defined by a cell global identification (CGI). And, the network portion also forms, for instance, an IP (Internet Protocol) address location of the mobile station when attached to an IP network. Information identifying the home location, e.g., the billing address, of the mobile station is also available for use in location estimation.

In another aspect of the present invention, a GAN database is provided for storing collected location information associated with the mobile station. The GAN database is provisionable and updateable, dynamically to maintain an updated indication of the location of the mobile station, estimated by way of its connection, in communication connectivity, with a network portion of a radio network through which the mobile station communicates.

In another aspect of the present invention, multiple, i.e., a plurality of, location indications for a mobile station are stored at the GAN database. And, selection is made, from amongst the different, stored indications to identify best the location of the mobile station. Selection is made pursuant to a selection process that prioritizes data indications by their type. Selection is made in an ordered manner by determining availability of location data at the database that is to be used to generate a location estimate of an associated mobile station. If an access point location through which the mobile station communicates is available, the access point location is used for purposes of the location estimate. If the access point location is not available at the database, determination is made whether a mobile station GSM-CGI (Cell Global Identification) location is available. If so, further determine whether the CGI location is available. If available then compare this with the home location, e.g. billing address of subscriber. Then compare this with a configurable accuracy factor. If within the accuracy factor, then use the subscriber home location as the mobile location.

If neither the AP location data nor the CGI location data is available, then a determination is made as to whether an AP-CGI location, that is to say, the cellular-system cell in which the access point is positioned, is available. And, if available, the home location of the mobile station is also ascertained, e.g., as defined by its billing address. Comparison is made between the AP-CGI and the subscriber's location, with a configurable accuracy factor. And, if within an accuracy factor, then the subscriber's location is used. Otherwise, the AP-CGI location is used to position the mobile station.

If none of GSM-CGI nor AP-CGI location information is available at the database, then the public IP address of the mobile station is possibly utilized for purposes of location estimate, if such IP address information is available.

A comparison is made between the home location, e.g., by its billing address, of the mobile station, if such information is available, and the mobile station's public IP address. And if the home location is within an accuracy factor, then the home location is used as the location of the mobile station.

If the home location is not within the accuracy factor, then the location of the mobile station's public IP address is used as the location of the mobile station. If the public IP address is unavailable, the location of the mobile station is unascertainable.

In another aspect of the present invention, the GAN database is accessed and the location estimate is obtained therefrom in response to a request made for location information associated with the mobile station. The request is made, for example, by a public service access point responsive to, or during, a call placed by the mobile station to the public service access point. Or, the request is made directly by the mobile station or a radio network part responsive to the call placed by the mobile station. Or, the request is made by a mobile location center entity.

Thereby, a location estimate is provided for the location at which the mobile station is positioned when a call is placed. The location estimate is based upon collected information that identifies the network portion through which the mobile station communicates, has recently communicated, or the home location of the mobile station.

Thereby, even though the mobile station does not have GPS (Global Positioning System) information associated therewith or cellular-network-type calculations by which to identify the location of the mobile station, location information associated with the mobile station is ascertainable, available for use by a public service access point, or other entity, to be used in position determination of the mobile station.

In these and other aspects, therefore, apparatus, and an associated method, is provided for facilitating identification of a location at which a GAN-capable mobile station, connected in communication connectivity with a GAN radio network, is positioned. A GAN database is configured to store at least first location data associated with a first network element location at which the GAN-capable mobile station is connected in the communication connectivity. A location-request responder is capable of accessing the GAN database. The location-request responder is configured to provide a response to a location request that requests identification of the location at which the GAN-capable mobile station is positioned. The response is representative of selected location data stored at the GAN database.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
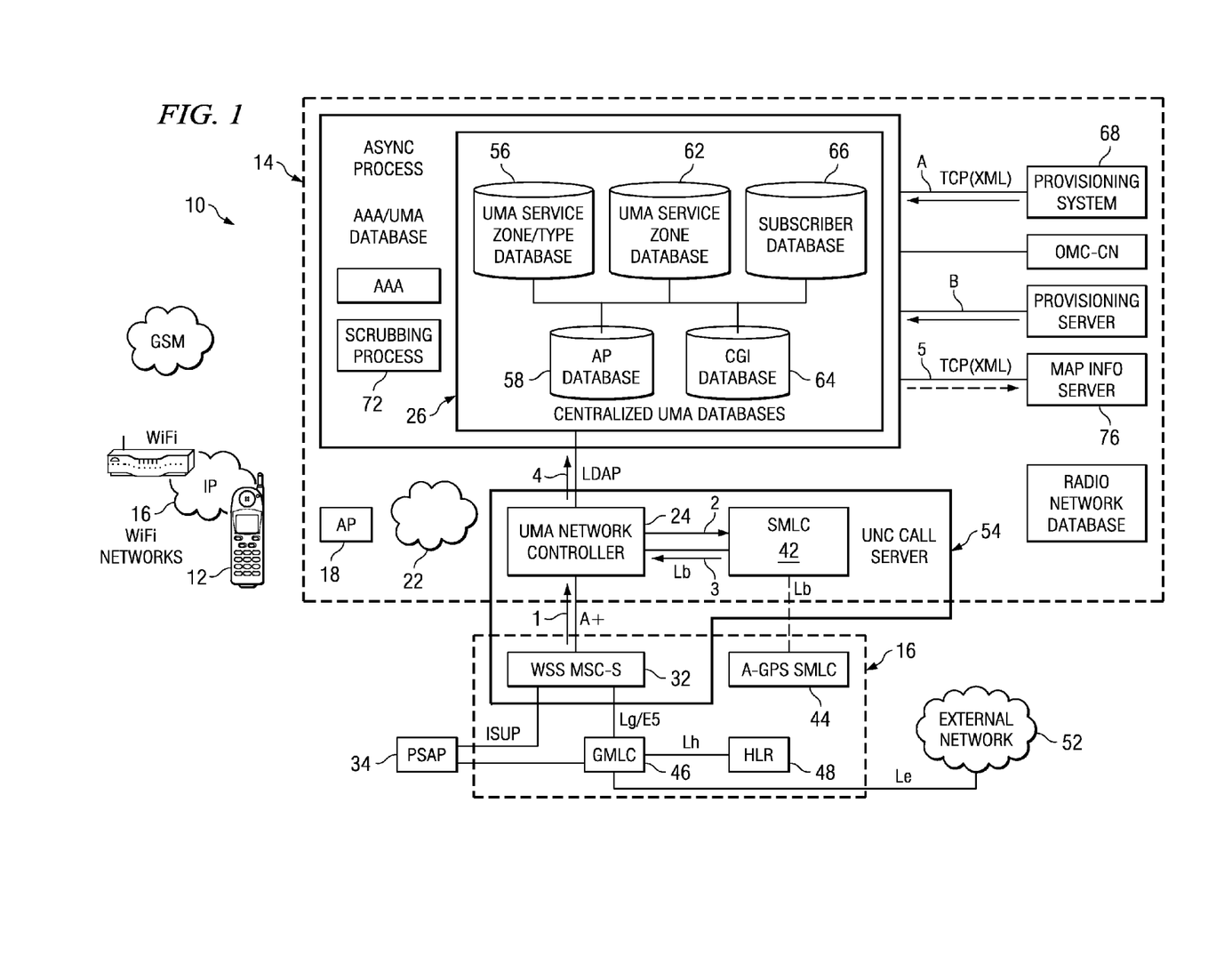
FIG. 1 illustrates a functional block diagram representative of a radio communication system in which an embodiment of the present invention is embodied.

Turning first to FIG. 1, a radio communication system, shown generally at 10, provides for radio communications with mobile stations, of which the mobile station 12 is representative. The mobile station communicates by way of a radio air interface with radio network elements. Here, the mobile station forms a multi-mode mobile station capable of communication with a GAN (Generic Access Network) 14 and also a cellular-system, e.g., a GSM (Global System for Mobile communications) network, viz. radio access and core networks 16. While, in the exemplary implementation, the mobile station forms a multi-mode mobile station, for purposes of operation of one embodiment of the present invention, the mobile station need merely be capable of connection in communication connectivity with the GAN part of the radio access network.

The general access network here forms a WiFi network, also referred to herein as a wireless local area network, operable in general conformity with operating protocols of a standard of the IEEE 802.11 family of standards. An access point (AP) 18 of the GAN is shown in FIG. 1, and the mobile station is positioned in proximity to the access point to permit communication therewith. The access point is connected, by way of a conventional IP (Internet Protocol) access network 22 to a network controller 24.

The controller 24 is coupled to a GAN database 26 whose contents are selectably accessible. The network controller is further coupled to a WSS MSC-S, of conventional construction of a GSM cellular communication system. And, the mobile switching center 32 is positionable in communication connectivity with a PSAP (Public Safety Access Point) 34. Additional entities used pursuant to location services are also shown in the figure. Namely, an SMLC (Serving Mobile Location Center) 42 and an A-GPS SMLC 44 are further shown. The SMLC 42 is embodied at, or coupled to, the controller 24. And the A-GPS SMLC is functionally associated therewith. And, FIG. 1 further shows a GMLC 46 coupled to a home location register (HLR) 48 and to an external network 52. Conventional connections therebetween are further illustrated in the figure. In the exemplary implementation, the elements 24, 32, and 42 are embodied at a call server 54.

The database 26 includes storage locations for a plurality of entries associated with a mobile station, here represented as database portions 56, 58, 62, 64, and 66. The portion 56 is representative of data entries pertaining to GAN service zone/type information, the portion 58 is representative of AP information, the portion 62 is representative of GAN service zone information, the portion 64 is representative of CGI information, and the portion 66 is representative of subscriber home address information. Additional, or other, database portions are analogously used in other implementations. Provisioning of the data and updating of the data is provided by functionality represented by the provisioning system 68 and a scrubbing process 72.

During operation of the mobile station, indications are provided to the database 26 and stored at appropriate portions thereat, indexed together with the identity of the mobile station. Pursuant to a subsequent call, placed by way of the mobile station when communicating by way of the GAN, access is made to the stored contents of the database to provide the PSAP or mobile location center with a location estimate, based upon the location of the most appropriate stored data stored at the database. The PSAP or the mobile location center is able to identify with an area in which the mobile station is positioned, thereby better permitting a response to be made to the request of the call in the event that the caller is unable to identify the location from which the call is placed.

As indicated by the database portions, location estimations are based, variously, upon the geographical location data of the access point at which the mobile station establishes an IP connection with the generic access network controller 24. Or, the location estimate is based upon the home address of the subscriber, when in communication connectivity with a home access point. Or, the location estimate is based upon a previous GSM CGI (Cell Global Identification) recorded within a certain time frame. Or, the location estimate is based upon the public IP address of the mobile station. Location data is stored at an appropriate portion of the database 26. Mobile-station, public address location information is provided to the database by way of an MAP info server 76 that is positioned in communication connectivity with the database. In the exemplary implementation, the location information is coded as latitudinal and longitudinal position information.

When a location estimate is to be ascertained, the estimate is based upon available location data stored at the database.

Figure 2:
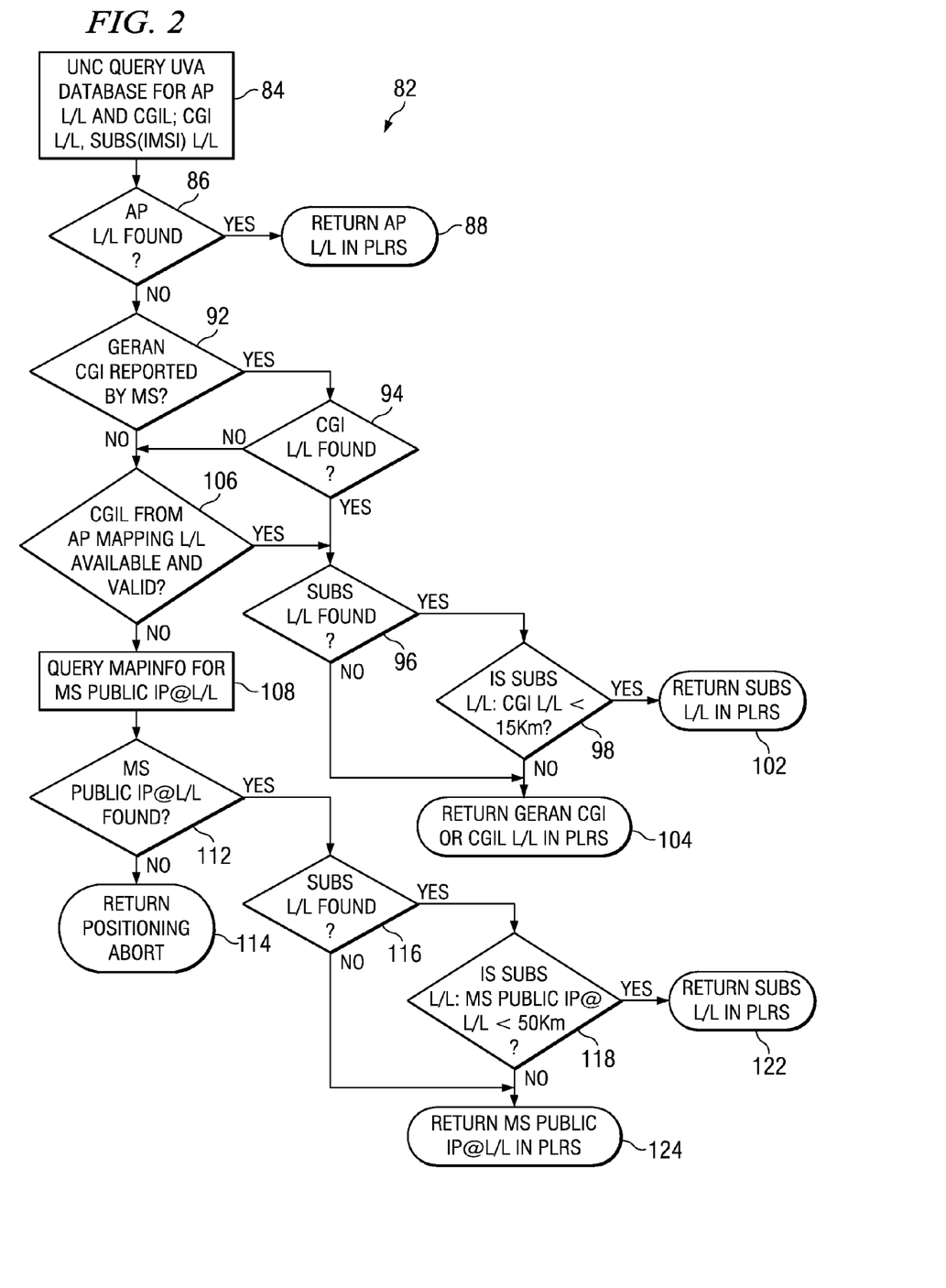
FIG. 2 illustrates a process diagram representative of exemplary operation of an embodiment of the present invention.

FIG. 2 illustrates the selection process, shown at 82, pursuant to operation of an exemplary embodiment of the present invention.

First, subsequent to an inquiry, indicated by the block 84, made by the network controller 24, a determination is made, indicated by the decision block 86, as to whether identification by, e.g., latitudinal and longitudinal coordinates, of the access point (AP L/L) through which the mobile station communicates is available. If so, the yes branch is taken to the block 88, and access point information is returned to be used pursuant to location estimation. In the exemplary implementation, the signaling comprises 3GPP (Third Generation Partnership Project)-defined signaling. PLRS (Provide Location Request Signal) is a 3GPP-defined signal. If, conversely, the access point information is not available at the database, the no branch is taken to the decision block 92. At the decision block 92, a determination is made as to whether the GERAN (GSM EDGE Radio Access Network) CGI (Cell Global Identification) has been reported by the mobile station and stored at the database. If so, the yes branch is taken to the decision block 94 and a determination is made as to whether the CGI information (CGI L/L) has been located. If so, a yes branch is taken to the decision block 96, whereat a determination is made as to whether the subscriber home location has been located. If so, the yes branch is then taken to the decision block 98, and a determination is made as to whether the subscription home location information is within a selected accuracy factor. If so, the yes branch is taken to the block 102, and the subscription information is returned. Otherwise, the no branch is taken to the block 104, and CGI information is returned and used pursuant to a location estimate. A no branch is also taken from the decision block 96 to the block 104.

No branches taken from decision blocks 92 and 94 extend to the decision block 106. At the decision block 106, a determination is made as to whether a AP-CGI from the access point is available and valid. If so, the yes branch is taken to the decision block 96. Otherwise, the no branch is taken to the block 108, and an inquiry is made for map information for the public IP address of the mobile station. And, thereafter, as indicated by the a determination is made decision block 112, as to whether the public IP address of the mobile station has been located. If not, no location estimate is performable and the no branch is taken to the block 114 at which the procedure aborts. If, however, the public IP address of the mobile station is available, the yes branch is taken to the decision block 116 whereat a determination is made as to whether subscriber home location information is found. If so, the yes branch is taken to the decision block 118 whereat a determination is made as to whether the subscriber information is within a selected accuracy factor. If so, the yes branch is taken to the block 122, and the subscriber information is returned and used pursuant to location estimation. No branches taken from the decision blocks 116 and 118 extend to the block 124. And, if such branches are taken, the public IP address of the mobile station is retrieved and used pursuant to generation of the location estimate.

In other words, pursuant to the procedure 82, if access point location information is available, the access point information is used. Else, if the mobile stations GSM CGI location information is available, the CGI location information is used. If the AP CGI location is available, the AP CGI location information is retrieved. And, if the subscriber home location is available, the home location information is retrieved. And, the home location information is compared with the AP CGI location information or GSM CGI information with a configurable accuracy factor. A determination is made of the most accurate location amongst the home location and the AP location. If the GSM CGI and AP CGI location information are not available, then the mobile station public IP location information is retrieved. And, if the mobile station public IP address information is not available, then no location estimate is possible.

In one implementation, the call server 54 forms an Alcatel™ 5020 Spatial Atrium Softswitch™. And, the controller 24 further includes a media gateway that, e.g., connects the aforementioned, Alcatel™ 5020 Spatial Atrium Softswitch™ with additional capabilities that support communication operations. Further, the controller includes a security gateway (SGW) that operates, e.g., to create secured IP SEC tunnels on a broadband access network towards mobile stations, such as the mobile station 12. Additionally, the controller includes a GPRS gateway (GG) that, e.g., translates UMA RLC signaling into a standard Gb interface for connection towards an SGSN (not shown in the figures). And, the SMLC 42 is integrated within the call server portion of the controller.

In the exemplary implementation, the database 26 is formed of an Alcatel™ A1430™ multi-access data server. The data server also includes AAA functionality as well as the database functionality. And, the scrubbing process 72 functionality is also resident at the data server.

Pursuant to emergency call procedures, an emergency call placed by way of the mobile station is routed to an emergency center, here the PSAP 34, based upon an initial location estimate. The initial location estimate is determined and used to route the call to the PSAP. In the United States, mandates have been made relating to location positioning of a mobile station pursuant to an emergency call, referred to as an E-911 call. In an initial phase, phase 0, MSC routing of an E-911 call to an appropriate emergency center is required to be based upon a GERAN CGI, if available, or based upon a GERAN cell reported by the GAN-capable mobile station, if such information is available. Or, routing is based upon previously-stored information for the corresponding access point, if still valid, or default routing using controller-wide CGI information. In a second phase, phase 1/2, routing is required to be based upon ESRK or X/Y subscriber location information. An emergency center is to be provided with a more exact position estimate of the caller in phase 1/2, and the accuracy is intended first to be at a cell level and subsequently at a 100-300 meter range accuracy. And, the method is to be configured on the mobile switching center, based upon the GERAN CGI used in setting up the emergency call.

Location positioning is provided also for other types of LCS services as well as for position requests subsequently made by personnel of the PSAP. The 3GPP (Third Generation Partnership Project) provides an LCS framework architecture that involves an MSC, HLR, GMLC, SMLC, BSCs, and LMus. Interaction between such entities provides for determination by an LCS application of positioning of a mobile station. SMLC functionality is sometimes provided, or incorporated, onto a radio network controller, and as a result, location positioning services for a GAN network preferably includes built-in SMLC functionality or interfaces to stand-alone SMLCs. GAN-capable mobile stations generally do not include GPS (Global Positioning System) capabilities, and operation of an embodiment of the present invention provides a mechanism by which automatic position estimation is performed and provided to a PSAP pursuant to an emergency call.

The process, such as that described with the exemplary process set forth in FIG. 2, is based upon latitudinal and longitudinal coordinates of access points in which different levels of confidence are based upon several factors including, e.g., access points owned by a network operator, coordinates derived from a subscriber address and stored at a subscriber database, coordinates associated with a macro-GSM cell, and coordinates derived from a public IP address of the mobile station.

The SMLC functionality of an embodiment of the present invention provides an SMLC 44 that is formed of its own module that is independent of a network controller or MSC functions and capabilities. The SMLC utilizes standard GSM interfaces, including, e.g., a BSSAP-LE interface with appropriate additions due to specificities of a GAN. Additionally, the SMLC is usable as an interface to an external stand-alone network-based SMLC.

SMLC functionality is provided in multiple stages, including a first phase, a second phase, and a third phase. In the first phase, positioning uses service logic and available data. Available data is provided in any of various forms. Latitudinal and longitudinal coordinate values are provisioned manually against access points, and the provisioning is performed by a network operator for partners or by a subscriber at the subscriber's own access point. The coordinates alternately are obtained from radio planning databases identified against a GERAN CGI, coordinates measured against a subscriber home address or billing address, coordinates from an external GIS server that provides city-depth positioning data based on IP addresses, or GERAN CGI to access point mapping based on a dynamic scrubbing process. The service logic uses such data to obtain the most accurate location and returns such information to the GMLC by way of the Lb/Lg interface.

In a second stage, phase 2, similar procedures are carried out, but the coordinate provisioning is performed by way of an interface with a broadband access node, e.g., a presence server or a presence user agent. A presence server is also combinable with a GAN database.

In a third stage, phase 3, positioning is provided by way of an external SMLC, e.g., an assisted-GPS server. Availability is based upon GPS capabilities on GAN-capable handsets as well as interworking with external SMLCs using standard interfaces.

In the exemplary implementation, Atrium™ SMLC functionality is resident at the controller. Data used by this functionality is stored at the database 26. The scrubbing process is also resident at the database. In one implementation, the controller 24 and the MSC 32 are combined. In an alternate implementation, the SMLC 44 is also applicable to a stand-alone controller 24 due to its modular architecture.

SMLC functionality uses the standard LCS interfaces in the exemplary implementation both externally, i.e., towards an external SMLC as well as internally, i.e., towards the controller 24. The SMLC 42 interacts with the GMLC 46 by way of the BSS/MSC entities on the Lg interface. And, the controller 24 functions in the same way that a base station controller interacts with an SMLC 44 and the GMLC 46, by way of the MSC 32.

In the exemplary implementation, the access point database portion of the database includes the latitudinal and longitudinal coordinates calculated by a reverse geo-coding of a street address entered against the access point or a GERAN CGI that has been mapped onto an access point by way of the scrubbing process. Additionally, the database portion includes a level indicating the availability of the coordinates, e.g., as follows: the coordinates are derived from an accurate street address, i.e., an address of a provider hotspot or zone; the coordinates are derived from a subscriber address that is the same as the billing address of the subscriber; the coordinates are derived from the GERAN CGI that is mapped on to the access point; or invalid, that is to say, the field does not have a valid entry. The provisioning of the coordinates is based upon either a reverse geo-coding of access points street address information or subscriber address information or by way of a scrubbing process. The reverse geo-coding is done as part of the provisioning node or by a zone administrator.

The GERAN CGI database includes fields identifying coordinates provisioned using data already available in the GMLC or SMLC or radio planning (self-site) data. The database also includes a level indicating the validity of the coordinates ordered, e.g., as follows: coordinates from existing data. If no data is available, i.e., the GERAN CGI does not belong to a provider, the level indicates invalid. And, invalid in which the field does not include a valid entry. Provisioning of the coordinates is based upon the data available from the GMLC or SMLC database portions or from the radio planning databases. A conversion process is available to bulk in the data onto the database CGI database portion.

A GIS database portion is utilized to provide a mapping of the public IP address of the mobile station to a latitudinal/longitudinal coordinate. The database is provisionable from external GIS database providers that have the information relating to IP address mapping to geographical coordinates. For example, a GIS vendor, such as MAP info can also provide the geo-coding and reverse geo-coding functions required to map street addresses to such coordinates.

A mechanism of an embodiment of the present invention is extensible to authorize access based on the location of an access point. In the same manner, a processing of GAN access for in-bound and/or out-bound roamers the location information is stored on the database to permit, or refuse permission of, access based on the rule set forth by a network operator. The rules are, for instance, built into the controller/SMLC service logic.

The scrubbing process is an automated manner by which to provision the AP/CGI mapping in the database and to maintain the mapping up-to-date when the mobile station is moved to another access point. The scrubbing process provides an intelligent manner by which to map an access point to a GERAN CGI that is received from the mobile station during mobile station registration. More applicable, the coordinates associated with the GERAN CGI are used to update an invalid, or lower accuracy set of coordinates in the access point database portion. Upon each registration or registration update with a GSM cell, the controller sends AP/GSM CGI mapping to the scrubbing process. The registration or its update is, e.g., piggy-backed onto an existing controller-database access. Scrubbing process updates the CGIL field of an access point table if the entry is not protected, the new matter differs from a currently stored mapping, or the stored information is old.

Figure 3:
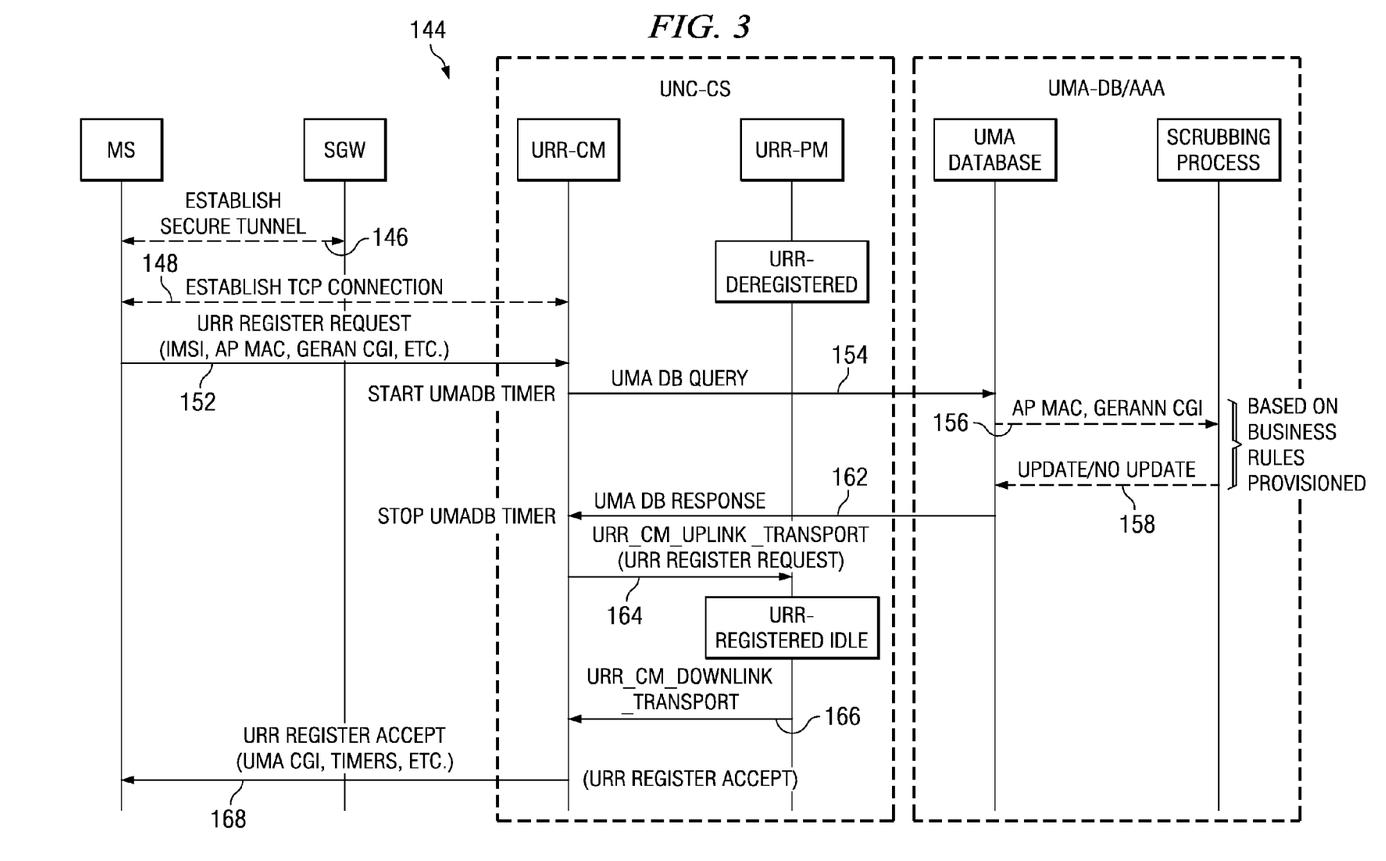
FIG. 3 illustrates a sequence diagram representative of exemplary signaling generated during operation of the communication system shown in FIG. 1 pursuant to scrubbing operations by which data is stored at a GAN database.

FIG. 3 illustrates a process diagram, shown generally at 144 representative of the invocation of the scrubbing process. Signaling is generated to establish a secure tunnel, establish TCP connection, and generate a URR register request, indicated by the segments 146, 148, and 152, respectively.

The segment 154 is representative of a database query and segments 156 and 158 are representative of scrubbing process operation at the database. The database response to the inquiry is represented by the segment 162. A register request is generated, indicated by the segment 164, and the downlink transport is indicated by the segment 166, and the URR register accept message, indicated by the segment 168, is returned to the mobile station.

Certain configurable business rules are used to ensure the validity of the AP MAC to GERAN CGI and GERAN CGI mapping. In the event of a mismatch between the new mapping and stored mapping, an update is, e.g., delayed for a selected duration. Repetitive mapping updates therefore do not generate excessive database updates. Alternately, an existing mapping is replaced only after a selected number of consecutive registrations are performed. A presence server, in one implementation, is substituted for the scrubbing process. Automation of the manner by which to obtain the geographical coordinates of an access point using, e.g., IETF protocols, is possible.

As noted above, the SMLC is, in the exemplary implementation, integrated with the controller. The Lb interface signaling between the controller and SMLC is supported by way of an internal IP connection in this exemplary implementation. The SMLC implements the main positioning technology selection function.

Figure 4:
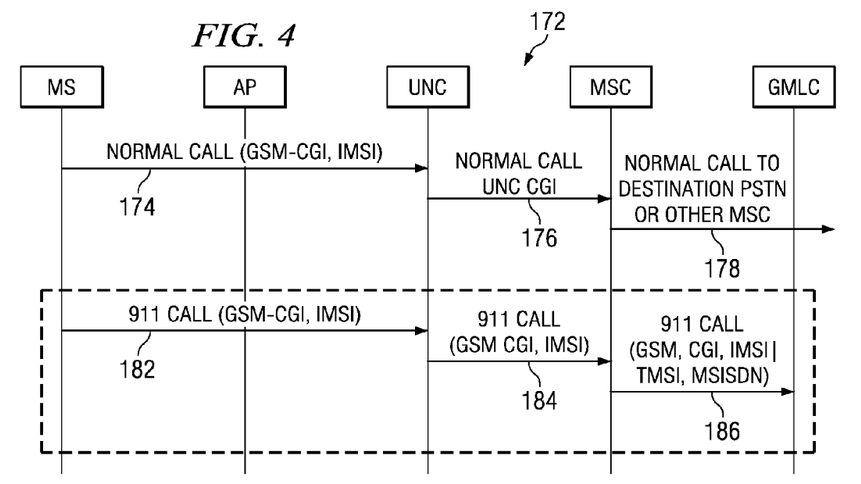
FIG. 4 illustrates a message sequence diagram, also representative of exemplary operation of the communication system 10 shown in FIG. 1, here of signaling generated pursuant to an emergency call setup of an emergency call placed by a GAN-capable mobile station.

FIG. 4 illustrates a representation, shown generally at 172, of signaling generated during a normal call set-up and pursuant to an emergency call set-up. Segments 174, 176, and 178 are representative of normal call set-up procedures. Conversely, segments 182, 184, and 186 are representative of emergency call set-up signaling. The controller sends to the MSC the GERAN CGI instead of the GAN CGI as is done pursuant to normal calls. This applies whether the call is received by way of an emergency call set-up or a normal call set-up with a called party number indicating emergency, e.g., a 911 call. In the event that no GERAN CGI was received in the emergency call set-up, the controller provides the value associated with the AP, if valid. And, if no GERAN CGI was received at the emergency call set-up and there is no valid GERAN CGI associated with the access point, the controller provides the controller CGI value. Such appropriate information is stored at the controller CGI.

In the emergency call set-up scenario, the mobile switching center behaves in the same way as when receiving an emergency call from a GSM BSC. In particular, the MSC continues to support MSC treatment for an emergency call based on the CGI associated with the call. The MSC basic 911 operation continues to be supported where the CGI maps to a PSAP configured for basic 911 operation. The MSC enhanced 911 routing by a GMLC is supported using INAP messaging or ISUP loop-around in which the CGI maps to a PSAP configured for high INAP/ISUP loop-around operation. The MSC also provides enhanced 911 routing by a GMLC using LCS messaging and continues to provide support where the CGI maps to a PSAP configured for LCS GMLC routing (MAP SLR with naESRK-request). Reference to an SMLC prior to call routing is a per-PSAP option. Enhanced 911 routing by an SMC with LCS messaging is also supported to a GMLC or the CGI maps to a PSAP configured for LCS MSC routing. Reference to an SMLC prior to call routing is a per-PSAP option. And, X/Y routing continues to be supported where a decision to route the call is made after determining the more accurate position of the subscriber.

Figure 5:
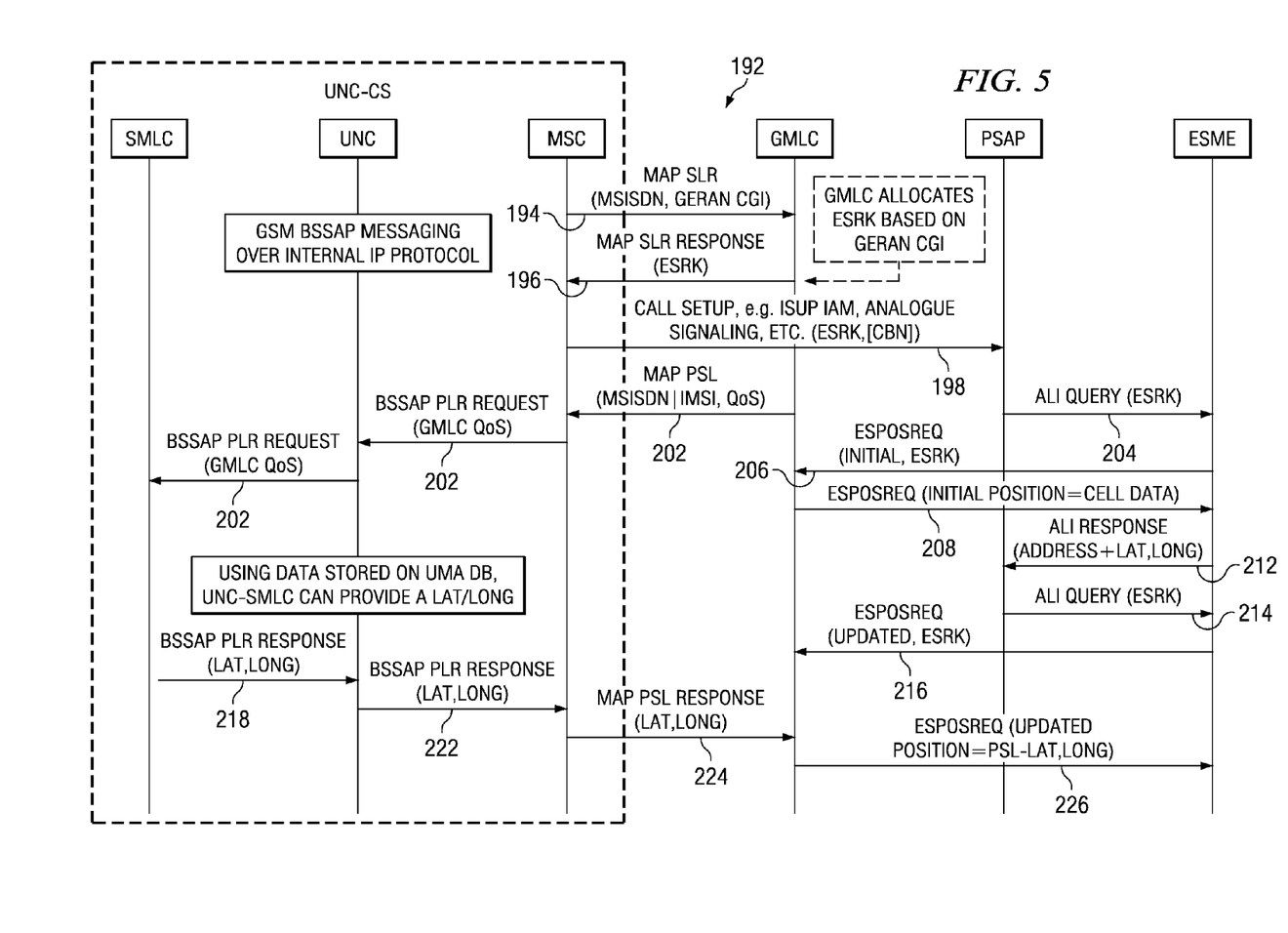

FIG. 5 illustrates a representation, shown generally at 192, of phase 2, E-911 call set-up using ESRK. Signaling is generated between the MSC and GMLC, indicated by the segments 194 and 196. Call set-up between the MSC and the PSAP is indicated by the segment 198 and an MAP PSL message is returned to the MSC, indicated by the segment 202. The PSAP generates an inquiry to an ESME, indicated by the segment 204, and additional signaling is indicated by the segments 206 and 208. A response and an inquiry is indicated by the segments 212 and 214, and additional signaling is provided to the GMLC, indicated by the segment 216. Signaling within the controller is indicated by the segments 218, 222, and 224 and a message is thereafter formed by the GMLC, indicated by the segment 226.

Upon receiving the call set-up, the MSC informs the GMLC using the MAP "subscriber location report" containing the GERAN CGI, if available, for the controller CGI, if not. The GMLC responds with an emergency services routing key (ESRK). The MSC routes the call using the ESRK received from the GMLC, and, at the same time, the GMLC requests for a more accurate position by way of the MAP "provide subscriber location" message. The MSC sends a BSSAP-LE "provide location request" message to the controller. The controller sends the BSSAP-LE "provide location request" to the SMLC. Then, the SMLC obtains data from the database to calculate the best position information and passes the coordinates of the best position information to the controller. And, the controller passes the coordinates to the MSC and the MSC passes the coordinates back to the GMLC.

Figure 6:
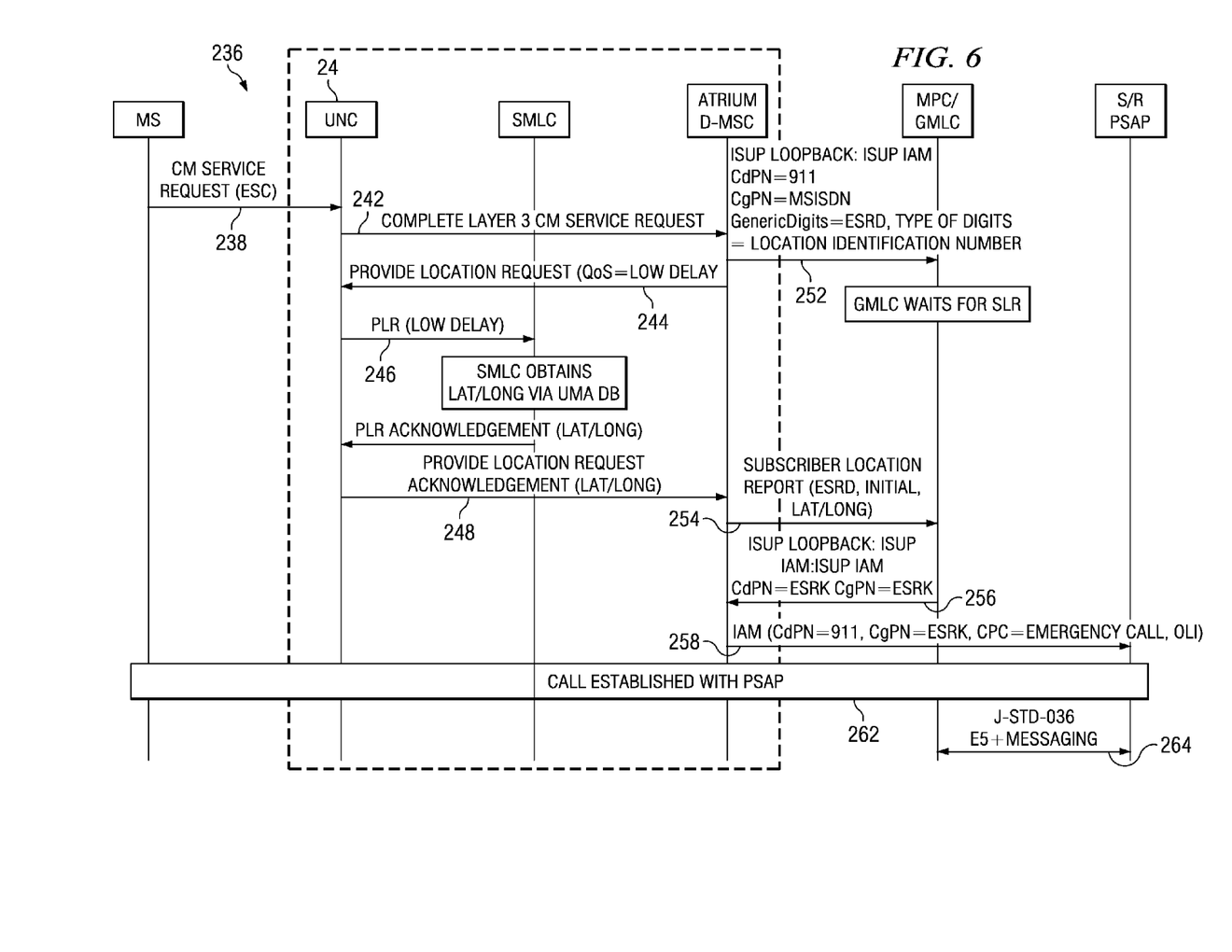
FIG. 6 illustrates a message sequence diagram, also representative of exemplary operation of the communication system 10 shown in FIG. 1, here illustrating signaling generated pursuant to alternate call setup procedures.

FIG. 6 illustrates a representation, shown generally at 236 of phase 2 call set-up using X/Y routing. A request is generated, indicated by the segment 238, by the mobile station and delivered to the controller 24. In turn, internal signaling is generated, indicated by the segments 242, 244, 246, and 248 between the controller and MSC. And, a message is provided by the MSC to the GMLC, indicated by the segment 252. A substitute location report is also forwarded, indicated by the segment 254 to the GMLC, and an ISU fee look back is returned, indicated by the segment 256. An IAM message is then generated, indicated by the segment 258. A call is established, indicated by the block 262, and subsequent messaging, indicated by the segment 264 is communicated.

Upon receiving the emergency call set-up, the MSC informs the GMLC using the ISUP loop-back method. At the same time, the MSC requests for a more accurate position by way of a BSSAP-LE "provide location request" message to the controller. The controller sends the BSSAP-LE "provide location request" to the SMLC. The SMLC obtains data from the database to calculate the best position information and passes the coordinates back to the controller. The controller passes the coordinates to the MSC, and the MSC passes the coordinates back to the GMLC by way of the MAP "subscriber location report" message. The GMLC responds with an emergency services routing key (ESRK) using the ISUP loop-back method. The MSC routes the call using the ESRK received from the GMLC.

Figure 7:
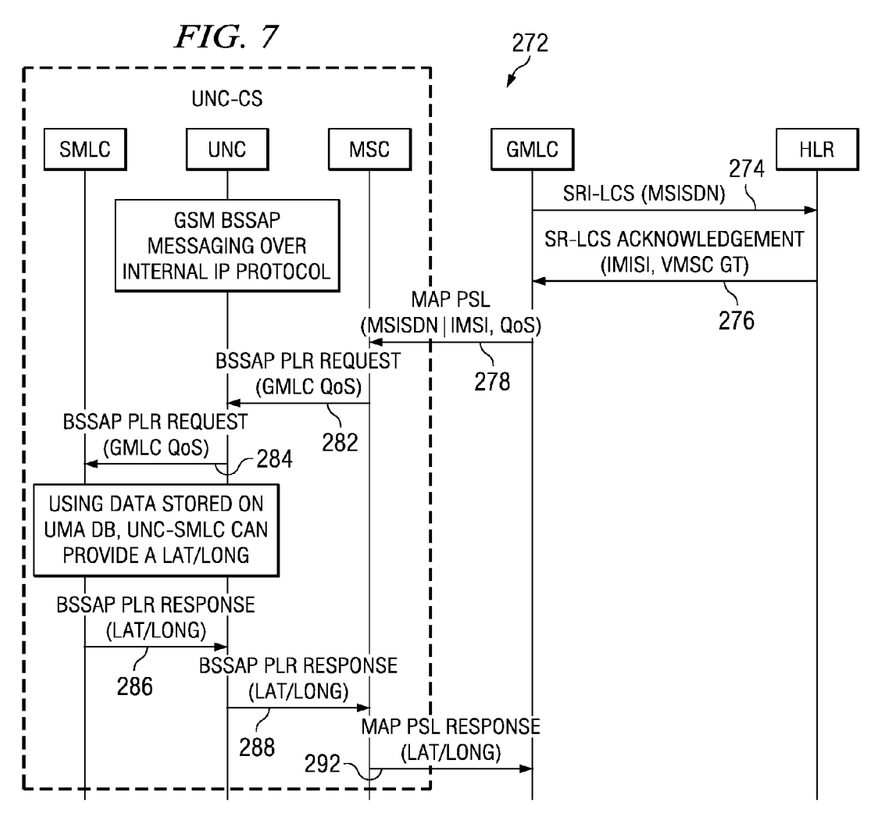
FIG. 7 illustrates a message sequence diagram representative of signaling generated pursuant to a location positioning request.

FIG. 7 illustrates a representation, shown generally at 272, illustrative of an LCS position request. Signaling is generated between the GMLC and the HLR, indicated by the segments 274 and 276. Signaling between the GMLC and the controller, and internal to the controller, as indicated by the segments 278, 282, 284, 286, 288, and 292.

During mid-call, the PSAP, by way of the GMLC, is able to request updated position information. The same messages, as described with respect to FIGS. 5 and 6, are again used.

Thereby, a manner is provided by which to create a location estimate of a GAN-compatible mobile station. Location estimation is based upon collected data pertaining to connection of the mobile station to a radio network.

The previous descriptions are of preferred examples for implementing the invention, and the scope of the invention should not necessarily be limited by this description. The scope of the present invention is defined by the following claims.

What is claimed is:

1. Apparatus for facilitating identification of a location at which a GAN-capable (Generic Access Network-capable) mobile station, connected in communication connectivity with a GAN radio network, is positioned, said apparatus comprising:

a GAN database configured to store location data associated with the GAN-capable mobile station, wherein the location data includes location information for two or more location types of: an access point through which the GAN-capable mobile station communicates, a billing address associated with the GAN-capable mobile station, a cell global identification of a cell associated with the GAN-capable mobile station, and an Internet Protocol address of the GAN-capable mobile station; and a location-request responder capable of accessing said GAN database, wherein the location-request responder is operable to:

access the GAN database to provide location information for the GAN-capable mobile station in response to a location request;

when available, provide the location data for the access point through which the GAN-capable mobile station communicates in response to the location request;

when the location data for the access point through which the GAN-capable mobile station communicates is not available in the GAN database for the GAN-capable mobile station, compare the billing address and the cell global identification (CGI) of the cell associated with the GAN-capable mobile station location data; and when the comparison of the billing address and the CGI are within a configurable accuracy factor, provide the billing address in response to the location request.

2. The apparatus of claim 1 wherein the radio network comprises an access point, wherein the GAN-capable mobile station is connected in the communication connectivity with the GAN network by way of the access point, and wherein the location data contained at said GAN database comprises data identifying positioning of the access point.

3. The apparatus of claim 1 wherein the radio network comprises a cell global identification identifying a cell in which the GAN-capable mobile station is positionable, and wherein the location data contained at said GAN database comprises data identifying positioning of the cell global identification.

4. The apparatus of claim 3 wherein the cell global identification comprises a Global System for Mobile communication, GSM, cell global identification.

5. The apparatus of claim 3 wherein the radio network comprises an access point and wherein the cell global identification identifies the cell in which the access point is positioned.

6. The apparatus of claim 1 wherein the GAN-capable mobile station is associated with a subscriber home location and wherein the location data contained at said GAN database comprises data identifying the subscriber home location.

7. The apparatus of claim 1 wherein the GAN-capable mobile station is associated with an Internet Protocol, IP, address and wherein the location data contained at said GAN database comprises data identifying the IP address of the mobile station.

8. The apparatus of claim 1 wherein the radio network is coupled to a public safety access point, PSAP, and wherein said location request responder provides a response to a location request from the PSAP, wherein the response includes the selected location information for the GAN-capable mobile station.

9. The apparatus of claim 8 wherein the location data stored at said GAN database is provisioned in response to registration of the GAN-capable mobile station.

10. The apparatus of claim 8 wherein the radio network is coupled to a public safety access point, PSAP, to which a call originated by the GAN-capable mobile station is routed, and wherein the response to the location request is responsive to origination of the call by the GAN-capable mobile station.

11. The apparatus of claim 8 wherein the radio network comprises a mobile switching center and wherein the location request is made by the mobile switching center.

12. A method for facilitating identification of a location at which a GAN-capable (Generic Access Network-capable) mobile station, connected in communication connectivity with a GAN radio network, is positioned, said method comprising the operations of: storing location data associated with the GAN-capable mobile station, wherein the location data includes location information for two or more location types of: an access point through which the GAN-capable mobile station communicates, a billing address associated with the GAN-capable mobile station, a cell global identification of a cell associated with the GAN-capable mobile station, and an Internet Protocol address of the GAN-capable mobile station; and a location-request responder capable of accessing said GAN database, wherein the location-request responder is operable to: access the GAN database to provide location information for the GAN-capable mobile station in response to a location request; when available, provide the location data for the access point through which the GAN-capable mobile station communicates in response to the location request; when the location data for the access point through which the GAN-capable mobile station communicates is not available in the GAN database for the GAN-capable mobile station, compare the billing address and the cell global identification (CGI) of the cell associated with the GAN-capable mobile station location data; and when the comparison of the billing address and the CGI are within a configurable accuracy factor, provide the billing address in response to the location request.

13. The method of claim 12 further comprising the operation of detecting the location request.

14. The method of claim 13 wherein the location request is generated by a public service access point and wherein said operation of responding comprises providing the selected location data to the public service access point.

15. Apparatus for a radio network having a GAN Generic Access Network) portion and a WAN portion, said network apparatus for providing GAN-capable (Generic Access Network-capable) mobile-station location information to a public safety access point, said apparatus comprising: a GAN database configured to include location data associated with a GAN-capable (Generic Access Network-capable) mobile-station, wherein the location data includes information for one or more location types of: an access point through which the mobile-station communicates, and a billing address associated with the mobile-station, and a cell global identification of a cell associated with the mobile-station, and an Internet Protocol address of the GAN-capable mobile station; and a location request responder capable of accessing said GAN database, said location request responder configured to: receive a location request for the mobile-station, wherein the location request requests location information of the mobile-station; access the GAN database to select the location data associated with the mobile-station; when available in the GAN database, select the location data of the access point through with the mobile-station is communicating as the selected location data; when the location data of the access point is not available in the GAN database, compare the billing address associated with the mobile-station and the cell global identification of the cell associated with the mobile station; when the comparison is within an accuracy factor, select the billing address associated with the mobile-station as the selected location data; and provide a response to the location request, wherein the response includes the selected location data.

16. The apparatus of claim 15, wherein the location request responder is further configured to:
when the cell global identification of the cell associated with the mobile station is not available in the GAN database, determine an Internet Protocol address of the mobile-station; and
when available, select the Internet Protocol address of the mobile-station as the selected location data.

17. The apparatus of claim 16, wherein the cell global identification of the cell associated with the mobile-station is an access point cell global identification associated with the mobile-station.

18. The apparatus of claim 16, wherein the cell global identification of the cell associated with the mobile-station is a GSM radio access network cell global identification associated with the mobile-station.

* * * * *